United States Patent [19]

Batsford

[11] Patent Number: 5,480,029
[45] Date of Patent: *Jan. 2, 1996

[54] AIR INFLATABLE/DEFLATABLE PACKAGING COMPONENT SHAPED TO FIT A CORNER OF AN ARTICLE

[75] Inventor: Charles A. Batsford, Stow, Mass.

[73] Assignee: Air-Ride Packaging of America, Inc., Stow, Mass.

[*] Notice: The term of this patent shall not extend beyond the expiration date of Pat. No. 5,351,829.

[21] Appl. No.: 227,798

[22] Filed: Apr. 14, 1994

Related U.S. Application Data

[63] Continuation of Ser. No. 153,485, Nov. 16, 1993, Pat. No. 5,351,829, which is a continuation of Ser. No. 2,066, Jan. 8, 1993, abandoned.

[51] Int. Cl.[6] .................................................. B65D 81/10
[52] U.S. Cl. ................................ 206/522; 206/591; 383/3
[58] Field of Search ............................ 206/522, 591, 206/521; 410/119; 441/108, 106; 383/3

[56] References Cited

U.S. PATENT DOCUMENTS

| | | | |
|---|---|---|---|
| D. 212,510 | 10/1968 | Baker . | |
| 1,457,496 | 6/1923 | Butler | 206/522 |
| 1,675,957 | 7/1928 | Reeve | 206/522 |
| 2,856,867 | 10/1958 | Dasey | 410/119 |
| 3,131,648 | 5/1964 | Seger | 410/119 |
| 3,161,339 | 12/1964 | Weller | 206/521 |
| 3,398,501 | 8/1968 | Aninger | 206/522 X |
| 3,554,135 | 1/1971 | Duvall et al. | 410/119 |
| 3,889,743 | 6/1975 | Presnick | 206/522 X |
| 4,287,250 | 9/1981 | Rudy | 206/522 X |
| 4,905,835 | 3/1990 | Pivert et al. | 206/522 |
| 5,143,775 | 9/1992 | Olsson et al. | 206/522 X |
| 5,180,060 | 1/1993 | Forti et al. | 206/522 |
| 5,184,727 | 2/1993 | Dickie et al. | 206/522 |

FOREIGN PATENT DOCUMENTS

| | | | |
|---|---|---|---|
| 395698 | 3/1909 | France | 441/108 |
| 1371316 | 7/1964 | France | 206/522 |
| 2385606 | 12/1978 | France | 206/522 |
| 2565931 | 12/1985 | France | 441/108 |
| 0848248 | 9/1960 | United Kingdom | 206/522 |
| 945466 | 1/1964 | United Kingdom | 206/522 |

OTHER PUBLICATIONS

Expandable Polystyrene Foam Toy Line Brought Out by Doughboy, P. Vogue, May 1962.

*Primary Examiner*—Bryon P. Gehman
*Attorney, Agent, or Firm*—Robert F. O'Connell; Ernest V. Linek

[57] ABSTRACT

A packaging component which, in one preferred embodiment is made of a first generally rectangular plastic element and a second generally oval plastic element, each of such elements being inflatable and deflatable. A plastic coupling element couples the first and second elements and a valve is used to permit air under pressure to be supplied to, or to be released from, the first and second elements so that they can be inflated and deflated. The elements are preferably made of laminates of a polyurethane plastic material. A plurality of said components when inflated can be manipulated into suitable cushion configurations which can be placed, for example, at each corner of a product which product can then be placed in a container so that the components provide a snug fit of the product therein and protect the product during shipment or other handling thereof.

9 Claims, 4 Drawing Sheets

5,480,029

AIR INFLATABLE/DEFLATABLE PACKAGING COMPONENT SHAPED TO FIT A CORNER OF AN ARTICLE

This is a continuation of application Ser. No. 08/153,485 filed on Nov. 16, 1993 now U.S. Pat. No. 5,351,829 and which is a continuation of Ser. No. 08/002,066 filed on Jan. 8, 1993, now abandoned.

This invention relates generally to product packaging techniques and, more particularly, to uniquely configured inflatable packaging components which provide more effective and reliable retention and protection of products during shipment, which components are both reusable and recyclable.

BACKGROUND OF THE INVENTION

Many products when being transported in shipping containers must be firmly retained in such containers under often severe handling conditions, i.e., when the containers are subject to vibration, dropping, or other relatively violent movements thereof, so as to prevent damage to the product. Current packaging techniques for such purposes conventionally utilize solid plastic foam blocks e.g., of polystyrene or other thermosetting plastic materials, which are specifically shaped to conform to an overall product or at least to selected portions of the product and act as substantially inflexible retainers which relatively completely, or at least partially, surround the product within a shipping container. In some cases, gaps between the product and the container are often loosely filled with separately formed polystyrene plastic pellets, sometimes referred to in the packaging field as plastic "peanuts" or "void fill", or the product may be completely immersed in such pellets within a container.

Such techniques are relatively expensive in that the components used therein are generally discarded once shipment has been made and the product has been removed from the container since such components are not readily reusable and generally cannot be readily recycled. Accordingly, they are often merely placed in landfills where they can be environmentally harmful since they do not degrade as would be desired.

While it has been suggested that simple rectangular plastic bags, i.e., polyethylene plastic bags inflated with air and permanently sealed, be merely placed at various positions adjacent a product in its container so as to provide a cushion therefor, such inflated polyethylene bags are not effective in retaining the product in a reasonably fixed position in the container and also tend to lose the air therein relatively rapidly so as to become unusable, either during or after transit, and are not readily recyclable. Moreover, such materials are not static dissipative materials, a characteristic which is often desirable in packaging many products, such as electronic products, for example. Further, such inflated bags are relatively easily punctured and often cannot withstand the rough handling which may occur during shipment.

It is desirable to provide a packaging technique which uses packaging components which can effectively retain products in a reasonably tightly fixed position in their shipping containers or cartons, which components can be reused many times before their usefulness ends, and which need not be discarded but rather can be easily recycled for refabrication of such components.

BRIEF SUMMARY OF THE INVENTION

In accordance with the invention, packaging components are formed as air inflatable and deflatable components having configurations which are uniquely predetermined in accordance with the shape of the products with which they are to be used, which components are easily and readily inflated, with an air pump, or readily deflated, by using an appropriate valve for such purposes. The components are made of a thermoplastic, polyurethane material which can retain its inflated state for an extended period of time and which, when its useful life is over, need not be discarded but can be recycled so that such components can be refabricated. Moreover, such materials can be made static dissipative in nature for use in many applications requiring such characteristic.

In one preferred embodiment, for example, a unique and useful component configuration utilizes a generally rectangularly shaped portion coupled to a generally oval, or elliptically, shaped portion, the overall component, when inflated, being foldable in a manner so as to form a uniquely shaped inflated cushion element which can be placed, for example, at a corner of a product so as to provide a firm and snug fit thereon. A plurality of such configured components used at each corner of a product within a shipping container or carton provides an effective technique for firmly and safely retaining the product within the shipping container so that the product can stand relatively violent handling thereof during shipment. Other uniquely configured components can be devised in accordance with the invention, the configurations of which depend upon the general shape of the product to be retained so that the advantages thereof can be achieved for a variety of different product configurations.

DESCRIPTION OF THE INVENTION

The invention can be described in more detail with the help of the accompanying drawings wherein FIG. 1 shows a plan view of one embodiment of a packaging component in accordance with the invention;

Figure 1:
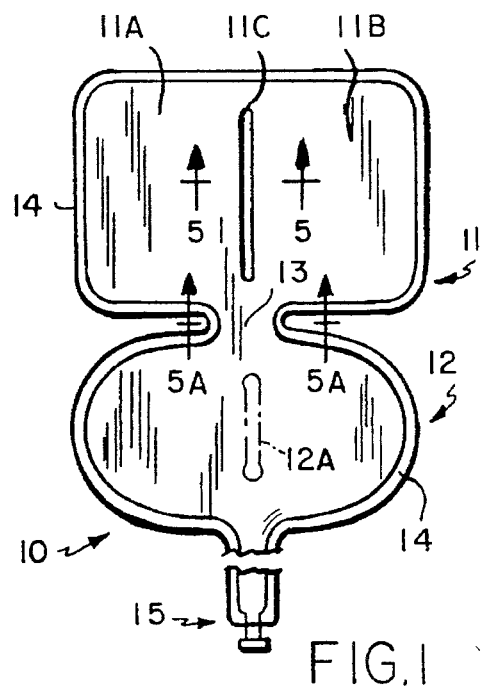
Figure 2:
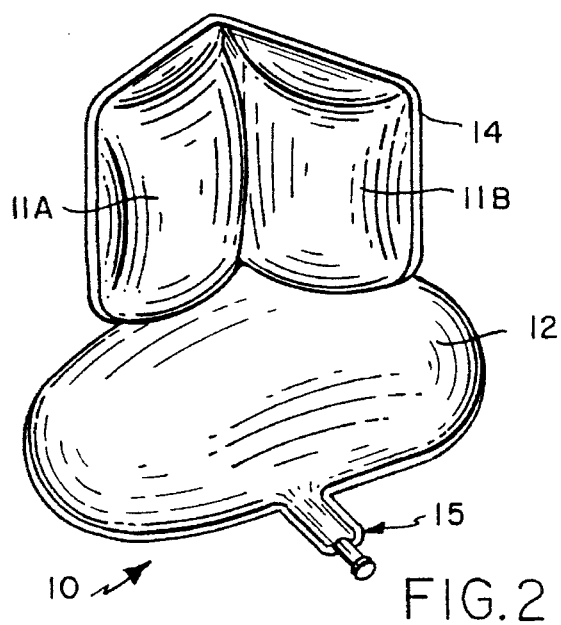
FIG. 2 shows a perspective view of the embodiment of FIG. 1, when inflated.
Figure 3:
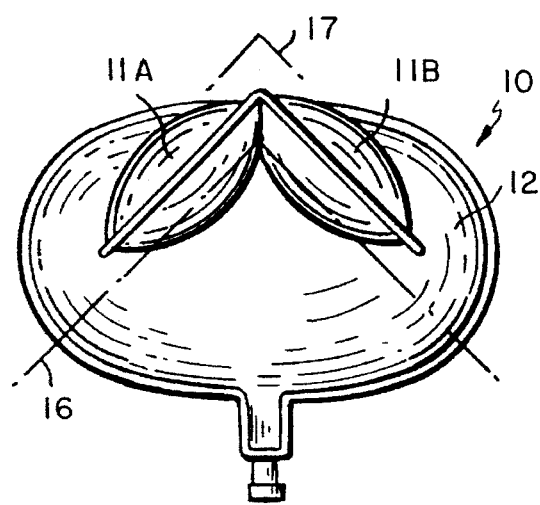
FIG. 3 shows a perspective view of the embodiment of FIG. 2 looking down at the top thereof.
Figure 5:
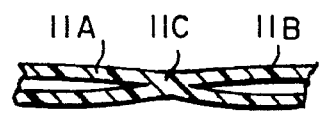
FIG. 5 shows a view in section of a portion of the embodiment of FIG. 1.
Figure 5A:
FIG. 5A shows a view in section of another portion of the embodiment of FIG. 1.
Figure 4:
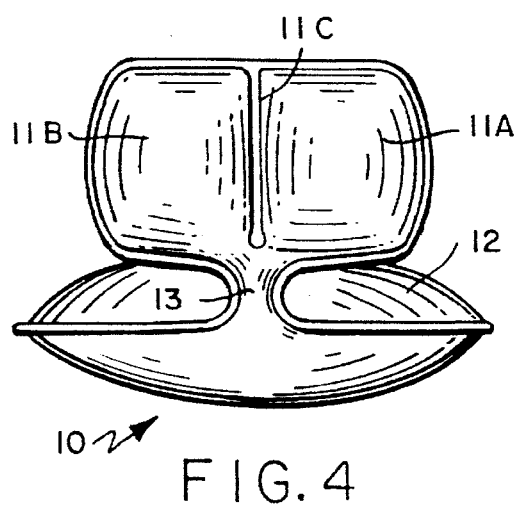
FIG. 4 shows a perspective view of the embodiment of FIG. 2 looking at the rear thereof.

As can be seen in FIG. 1, a plan view of a basic packaging component 10 in its non-inflated form, in accordance with a preferred embodiment of the invention, is configured so as to comprise a first generally rectangular inflatable element 11 which comprises a pair of inflatable portions or compartments 11A and 11B each of which has a generally rectangular shape, separated by a non-inflatable portion 11C therebetween (as partially shown in section in FIG. 5), and a second inflatable element 12 which has a generally oval shape, elements 11 and 12 being coupled to each other via an inflatable channel 13 (as shown in section in FIG. 5A). As used herein, the term "generally oval" is intended to include elliptical shapes, diamond shapes, triangular shapes, and the like, which provide a generally oval appearance.

Each element of packaging component 10 is formed of an upper and lower layer of suitably selected plastic material which layers are sealed together, as by using radio frequency (R-F) sealing techniques, for example, at portion 11C and about the peripheral portion 14 of component 10. A projecting portion 15 thereof, which extends from portion 12, for example, in the particular embodiment depicted, has a suitable valve assembly (not shown here but discussed in more detail below) positioned therein, the valve being connected to a suitable external air pump (not shown) so that when the valve is opened, air is supplied between the upper and lower layers so as to inflate the inflatable elements, 11A, 11B, 12, and 13.

When the component is suitably inflated, the valve is then closed, the pump is disconnected therefrom, and the projecting portion is suitably plugged so that the inflated elements are then appropriately sealed and formed for use. The inflated component can then be manipulated into a folded shape, as shown in the front and rear views thereof in FIGS. 2 and 4, respectively and in the top view thereof in FIG. 3 so as to firmly fit around a corner of a product 16, as partially shown in phantom in FIG. 3, so that component 10 can act to cushion the corner thereof when the product and the component are placed within a shipping container, a corresponding corner 17 of which is partially shown in FIG. 3. The component 10 shown in FIGS. 1–4 represents a basic component configuration, a plurality of which can be utilized in combination to form an overall packaging system for a product, as discussed more fully below.

Figure 6:
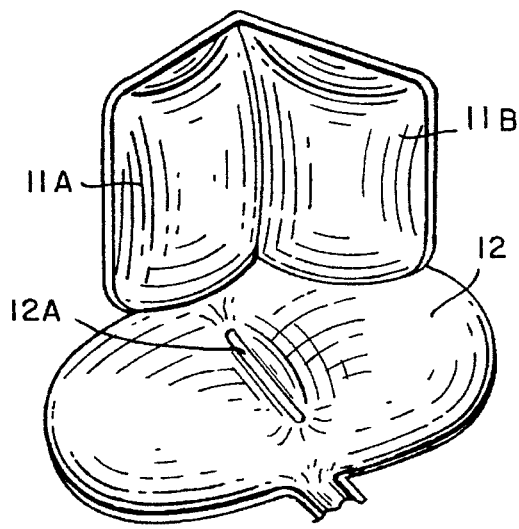
FIG. 6 shows a perspective view of a modified embodiment of FIG. 2.

The oval portion 12 of such component configuration can optionally have a non-inflatable region therein, comparable to region 11C, as shown in phantom by region 12A in FIG. 1. When such non-inflatable region 12A is used, the component assumes the inflated configuration depicted in FIG. 6.

The plastic material used for the layers of such component is specially selected to provide a relatively strong, as well as a reusable and recyclable, element. The component can further be formed so as to be capable of having effective static dissipative characteristics, if desired, using techniques that are well known to those in the art. In a preferred embodiment of the invention each layer of such component is in the form of a laminated layer of thermoplastic, polyurethane polymer plastic material. The laminate is preferably formed from two sheets, or films, of thermoplastic, polyurethane material such as made and sold by Deerfield Urethane, Inc. of South Deerfield Massachusetts under the designation PS8020F. The polyurethane sheets are then laminated together by a suitable heat lamination process, a laminated layer of such type being available, for example, from Mann Industries of Framingham Massachusetts under the designation PS8010F.

It has been found that such a two-sheet laminate is effective for use with products weighing up to about fifty pounds or so. For heavier products, it may be desirable to utilize a laminate comprising two sheets of thermoplastic, polyurethane material having an intermediate sheet of a closely woven, nylon mesh positioned therebetween to form a three-sheet, heat sealed laminate.

In a typical embodiment, for example, polyurethane films each having a thickness of 0.003 mil are used to form an overall laminate of 0.006 mil, while a third sheet of nylon mesh, if used, has a thickness of 0.001 mil to form an overall laminate of 0.007 mil. It is generally found that sheets of polyurethane film having a thickness between about 0.003 mil through 0.007 mil.

A plurality of basic components 10 having the general configuration depicted in FIGS. 1–4 can be placed at the corners of a rectangular product within a container. Thus, the components 10 can be formed as parts of a larger packaging system 20 such as depicted by the plan view of an exemplary overall configuration of a larger packaging system shown in FIG. 7 which is depicted in a non-inflated condition. As can be seen therein, a plurality of basic components 10, preferably four basic components as shown, are coupled via an extendable, and generally serpentine shaped, inflatable coupling channel 21 which includes a valve extension 22 containing a suitable valve for inflating and deflating the overall component, in the manner discussed above. When inflated, each basic component 10 of the overall system 20 can be appropriately manipulated into the configuration shown in FIG. 2 and positioned at each of four corners of the top of a product 23 in a container 24, for example, such as shown in the plan view of FIG. 8 looking down at the top of product 23. A similar overall inflatable packaging system 20 (not seen in the figures) is also used to provide appropriate cushions at each of the four corners at the bottom of the product 23. When positioned in a shipping container 24, the product is then firmly retained therein, as desired.

The use of an extendable serpentine, inflatable coupling channel 21 permits the overall system to be usable for different size products, the number of loops therein, when extended following inflation, determining the largest size which can be accommodated. Alternatively, the coupling channel may have a specifically selected, relatively short, configuration, the length of which is specifically designed to accommodate a particular product having a known, specified size.

Figure 9:
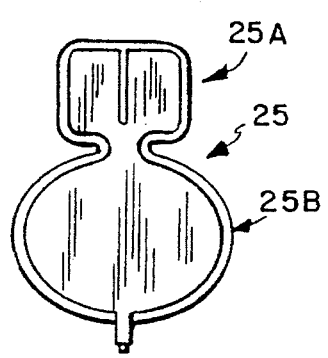
FIGS. 9 and 10 show modifications of the configuration of the invention of FIG. 1.
Figure 10:
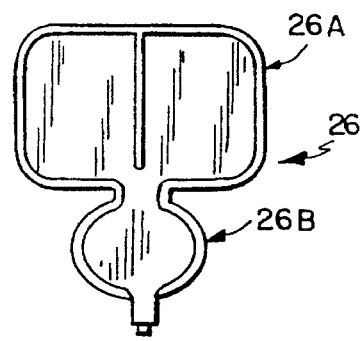

The relative sizes of the generally rectangular and generally oval portions of a basic component 10 can be appropriately selected depending on the dimensions of the product being packaged. FIGS. 9 and 10, for example, depict basic non-inflated component configurations 25 and 26, respectively, in which the generally rectangular portion 25A thereof is smaller than the generally oval portion 25B thereof in FIG. 9 and the generally rectangular portion 26A thereof is larger than the generally oval portion 26B thereof in FIG. 10.

The particular basic component and system configurations described above represent exemplary embodiments of the invention. It is clear that the number of basic components used, the relative sizes of the generally rectangular and generally oval elements thereof, and the nature of the coupling channel used can be suitably selected for particular product applications for which the invention is to be used.

While the above basic components and packaging system described above find extensive use for many products of different sizes, it is desirable to devise other packaging components and system configurations which are useful for certain products having still other shapes which can be better accommodated by other uniquely configured packaging components, as described below.

Figure 11:
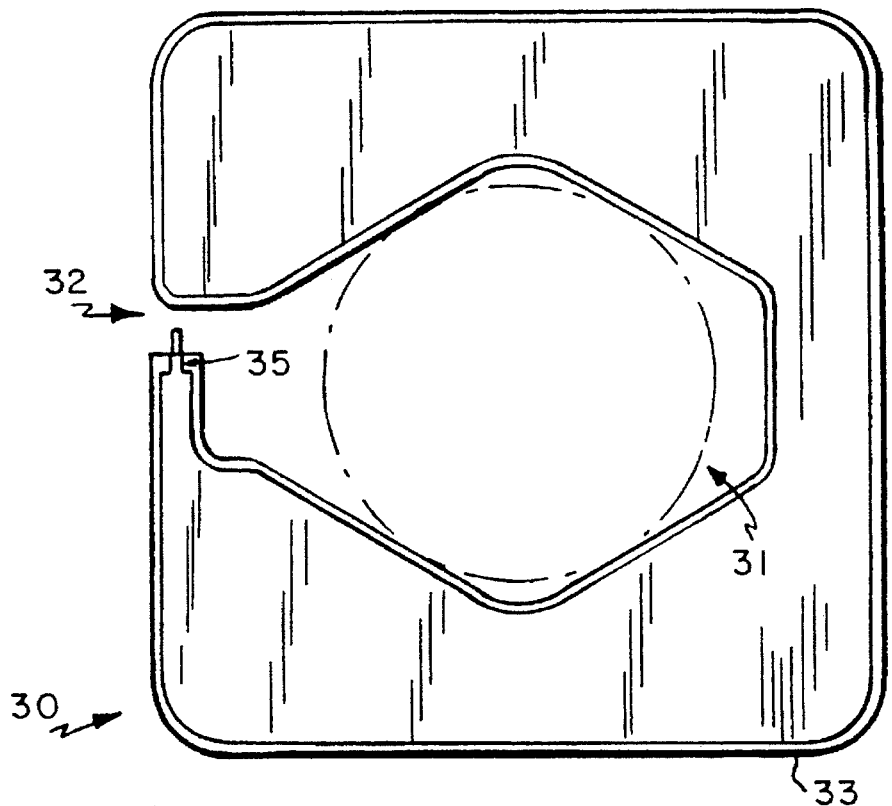
FIG. 11 shows a plan view of an alternative embodiment of a packaging component of the invention.
Figure 12:
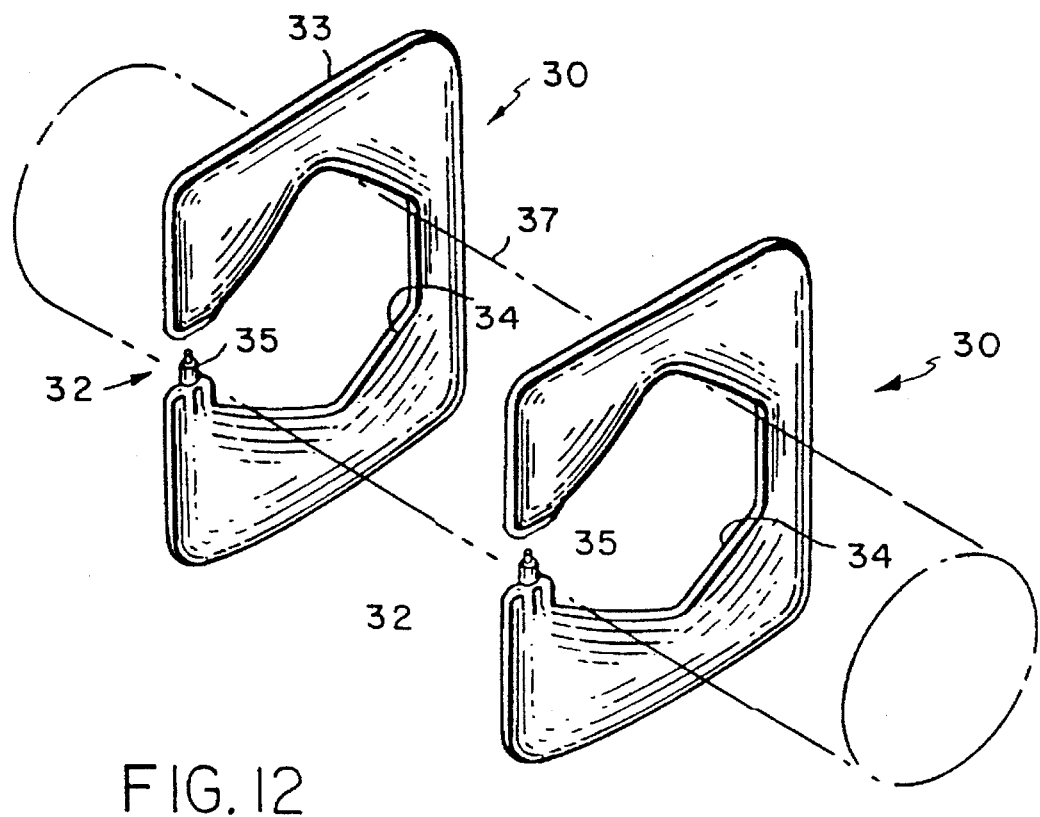
FIG. 12 shows a perspective view of a plurality of packaging component of FIG. 11 used with a product.

One such configuration is shown, for example, in FIG. 11 which depicts in a plan view, a generally rectangular shaped component 30 having a generally elliptical opening 31 therein, the component being separated at a suitable location 32. As shown in FIG. 12, component 30, when inflated, generally forms an annulus having a generally rectangular outer periphery 33 and a generally elliptical inner periphery 34, which annulus is separated at location 32. A suitable valve extension 35 having a valve of the type discussed below is positioned at one end of the annulus generally at location 32 for inflating the component 30. As shown in FIG. 12, a number of such components, when inflated, can be positioned so as to encompass a tubular or square product 37, shown in phantom, at selected positions along the length thereof. A manual separation of the annulus at location 32 allows a user to open up the component 30 so as to more easily position it around the product 37, i.e., when the annulus is separated it can be readily slipped over the product. Subsequently, when the annulus is not manually separated, it assumes its natural inflated annular shape as shown in FIGS. 11 and 12.

Figure 7:
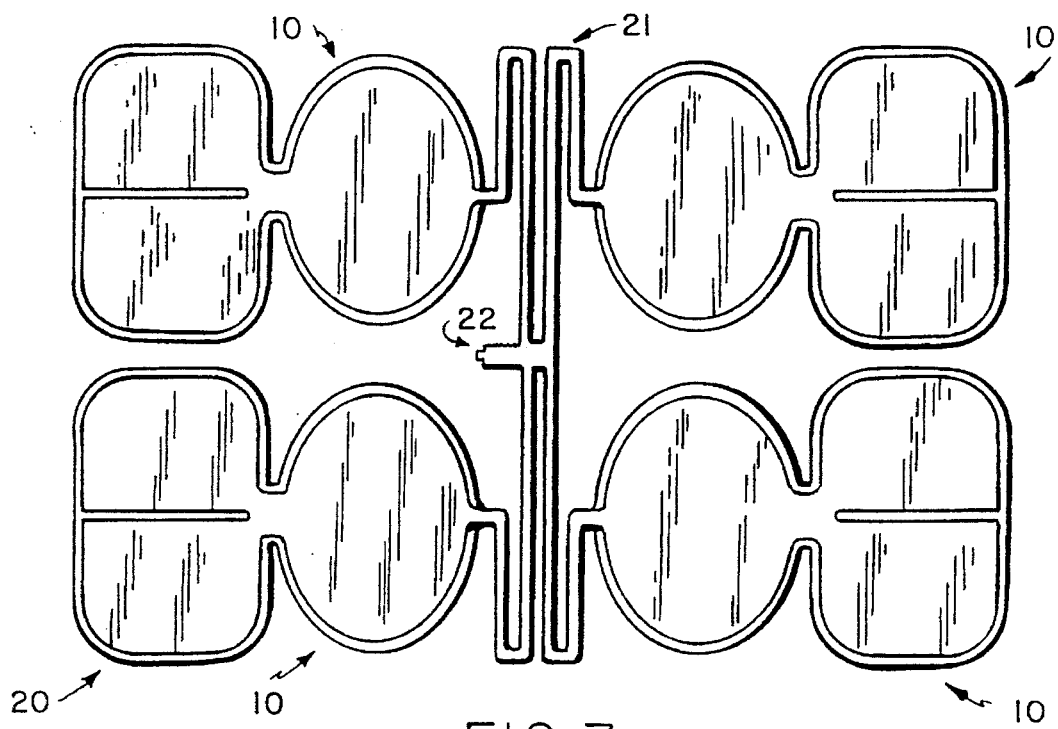
FIG. 7 shows a plan view of a packaging system of the invention using a plurality of packaging components of FIG. 2.
Figure 8:
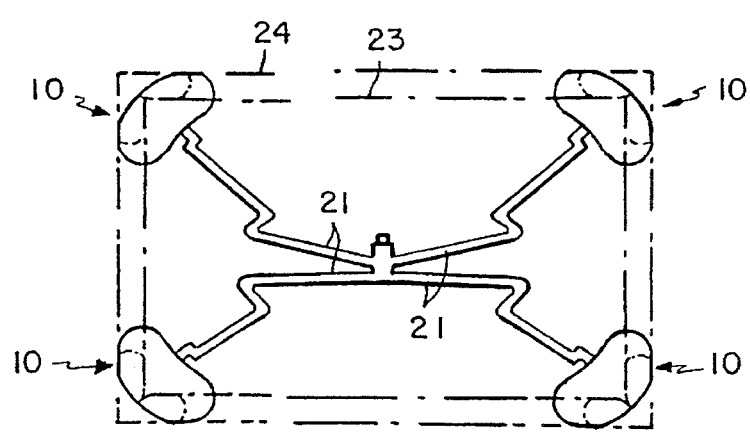
FIG. 8 shows a plan view of the packaging system of FIG. 7 as used with a product.
Figure 13:
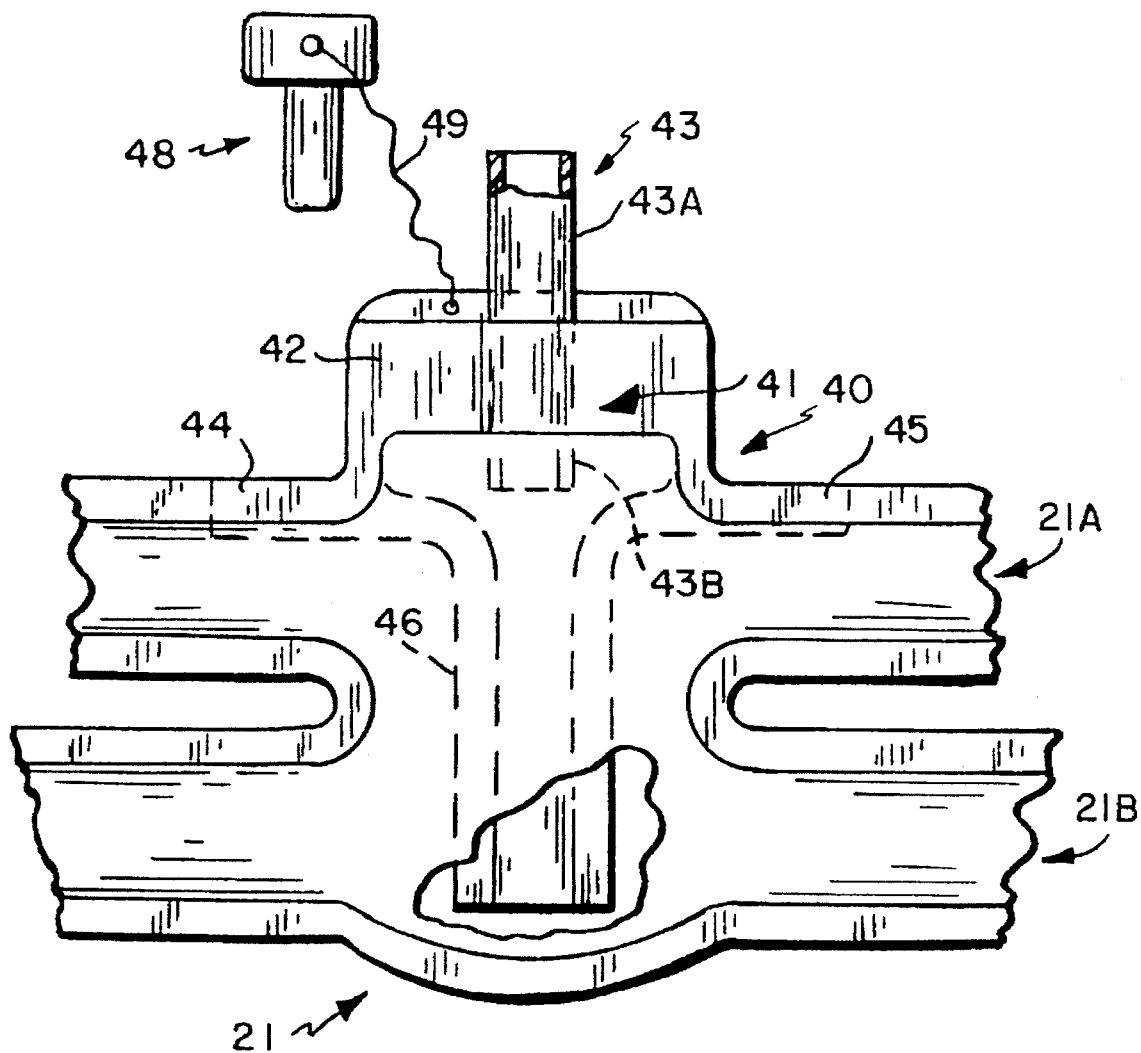
FIG. 13 shows a side view of a valve assembly used in a typical embodiment of the invention.

FIG. 13 shows a more detailed view of a typical valve extension portion 40 positioned at a selected location of a component such as in a coupling channel 21, for example, in a packaging system such as shown in FIGS. 7 and 8. As seen in FIG. 13, a valve assembly 41 includes a relatively rigid plastic insert member 42 having extensions 44 and 45 which are attached at either side thereof at the peripheral edges 46 and 47, respectively, of a coupling channel portion 21A. A rigid tubular member 43 has an upper end 43A which extends outwardly from insert member 42 and a lower end 43B which extends through insert member 42. A flutter valve element 48, also suitably attached at the periphery of coupling channel portion 21A, extends downwardly into coupling channel portion 21B, the lower end 43B of rigid tube 43 extending into the upper portion of flutter valve element 48, as shown. The flutter valve assembly 41 is of a generally known type made of compatible urethane material, such as made and sold by Gregory Manufacturing Co. of Holyoke, Mass., which can be readily adapted for use in applicant's system, as shown in FIG. 13.

When the output end of a standard and readily usable air pump (not shown) is applied to the input end of rigid tubular member 43, the overall packaging system is inflated as air is supplied under pressure to the systems via coupling channel portions 21A and 21B by way of flutter valve element 46 which automatically opens when the pressurized air is so supplied.

After the packaging system has been inflated, as desired, the output end of the air pump is removed from tubular member 43, and, when no air under pressure is being so supplied, flutter valve element 46 automatically closes. A solid plastic plug 48 as shown in FIG. 13 can be inserted into the open end of tubular member 43 to seal the opening so as to prevent air from escaping therefrom. Plug 48 can be attached to the valve assembly 41 via a tie cord 49 and, after inflation and removal of the pump, it can be inserted into tube 43 to seal the outer end of the valve assembly to ensure that the inflated packaging system is effectively sealed.

While the above embodiments represent preferred exemplary embodiments of the invention, others may occur to those in the art within the spirit and scope of the invention. Hence, the invention is not to be construed as limited to the particular embodiments described above except as defined by the appended claims.

What is claimed is:

1. A packaging component for protecting a product when placed in a shipping container, said component comprising:

a first single generally rectangular inflatable and deflatable plastic element having a non-inflatable region for providing two inflatable and deflatable compartments in said first element;

a second single generally oval inflatable and deflatable plastic element positioned remotely from said first element;

an intermediate inflatable and deflatable plastic coupling element substantially centrally positioned between said first and second elements for coupling said first and second elements;

a valve for permitting air under pressure to be supplied to, or to be released from, said first element, said second element, and said coupling element whereby said elements are inflated, or deflated, respectively; and the shapes of said first and second elements and said coupling element being such that when said first, second, and coupling elements are inflated and positioned so that said first element is folded substantially along said non-inflatable region and positioned substantially perpendicularly with respect to said second element, and said coupling element is centrally positioned therebetween, they form a corner-shaped configuration for enclosing a corner of a product so as to provide a firm and snug fit thereon when a product is placed in a container.

2. A packaging component in accordance with claim 1 wherein said first element, said second element, and said coupling element are formed of layers of laminated polyurethane film material sealed about the peripheries of said elements.

3. A packaging component in accordance with claim 2 wherein said laminated film material includes a pair of thermoplastic, polyurethane sheets laminated together.

4. A packaging component in accordance with claim 3 wherein the thickness of each of said pair of thermoplastic, polyurethane sheets is in a range from about 0.003 mil to about 0.007 mil.

5. A packaging component in accordance with claim 4 wherein the thickness of each of said thermoplastic, polyurethane films is about 0.003 mil.

6. A packaging component in accordance with claim 2 wherein said laminated film material includes a pair of thermoplastic, polyurethane sheets having an intermediate sheet of nylon mesh material therebetween, all of said sheets being laminated together.

7. A packaging component in accordance with claim 6 wherein the thickness of each of said thermoplastic, polyurethane sheets is in a range from about 0.003 mil to about 0.007 mil and the thickness of said nylon mesh sheets is about 0.001 mil.

8. A packaging component in accordance with claim 7 wherein the thickness of each of said thermoplastic, polyurethane films is about 0.003 mil and the thickness of said nylon mesh sheet is about 0.001 mil.

9. A packaging component for protecting a product when placed in a shipping container, said component comprising:

a first single selectably shaped inflatable and deflatable plastic element having a non-inflatable region for providing two inflatable and deflatable compartments in said first element;

a second single selectably shaped inflatable and deflatable plastic element positioned remotely from said first element;

an inflatable and deflatable plastic coupling element substantially centrally positioned between said first and second elements for coupling said first and second elements;

a valve for permitting air under pressure to be applied to, or to be released from, said first element, said second element and said coupling element whereby said elements are inflated, or deflated, respectively; and the shapes and relative positions of said first and second elements and said coupling element being such that when said first, second, and coupling elements are inflated and folded so that said first element is folded substantially along said non-inflatable region and positioned substantially perpendicularly with respect to said second element, and said coupling element is centrally positioned therebetween, they form a corner-shaped configuration for enclosing a corner of a product so as to provide a firm and snug fit thereon when a product is placed in a container.

* * * * *